United States Patent Office 3,597,506
Patented Aug. 3, 1971

3,597,506
O(S)-(1-HYDROCARBYL-2-ALKOXYIMINO-2-ALKOXYETHYL PHOSPHATES
Sidney B. Richter, Chicago, and Ephraim H. Kaplan, Skokie, Ill., assignors to Velsicol Chemical Corporation, Chicago, Ill.
No Drawing. Filed Sept. 6, 1968, Ser. No. 758,118
Int. Cl. C07f 9/08, 9/16; A01n 9/36
U.S. Cl. 260—944          6 Claims

ABSTRACT OF THE DISCLOSURE

Compounds of the formula

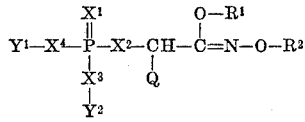

wherein $R^1$ and $Y^2$ are independently selected from the group consisting of alkyl, alkenyl and

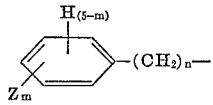

wherein Z is selected from the group consisting of alkyl, alkenyl, alkoxy, alkylthio, halogen, nitro, dialkylamino, alkylsulfoxide and alkylsulfone, m is an integer from 0 to 5, and n is an integer from 0 to 3; Q is selected from the group consisting of alkyl, alkenyl, alkoxy, alkylthio and

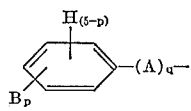

wherein B is selected from the group consisting of alkyl, alkenyl, alkoxy, alkylthio, halogen, nitro, dialkylamino, alkylsulfoxide and alkylsulfone, p is an integer from 0 to 5, A is seected from the group consisting of oxygen, sulfur, alkylene, alkyleneoxy and alkylenethio, and q is an integer from 0 to 1; $X^1$, $X^2$, $X^3$ and $X^4$ are independently selected from the group consisting of oxygen and sulfur; and $R^1$ and $R^2$ are alkyl. This invention also discloses insecticidal and acaricidal compositions comprising an inert carrier and, as an essential active ingredient, in a quantity toxic to insects and acarids, a compound of the above description; and further, a method of destroying insects and acarids which comprises applying to said insects and acarids an aforedescribed insecticidal and acaricidal composition.

---

This invention relates to new chemical compositions of matter, and more particularly relates to new compounds of the formula

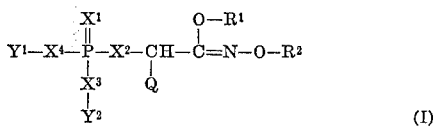

wherein $Y^1$ and $Y^2$ are independently selected from the group consisting of alkyl, alkenyl and

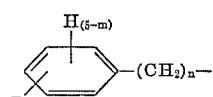

wherein Z is selected from the group consisting of alkyl, alkenyl, alkoxy, alkylthio, halogen, nitro, dialkylamino, alkylsulfoxide and alkylsulfone, m is an integer from 0 to 5, and n is an integer from 0 to 3; Q is selected from the group consisting of alkyl, alkenyl, alkoxy, alkylthio and

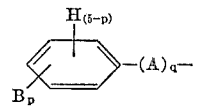

wherein B is selected from the group consisting of alkyl, alkenyl, alkoxy, alkylthio, halogen, nitro, dialkylamino, alkylsulfoxide and alkylsulfone, p is an integer from 0 to 5, A is selected from the group consisting of oxygen, sulfur, alkylene, alkyleneoxy and alkylenethio, and q is an integer from 0 to 1; $X^1$, $X^2$, $X^3$ and $X^4$ are independently selected from the group consisting of oxygen and sulfur; and $R^1$ and $R^2$ are alkyl.

In a preferred embodiment of this invention the substituents $Y^1$ and $Y^2$ are independently selected from the group consisting of lower alkyl, lower alkenyl and

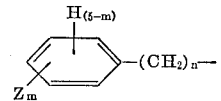

wherein Z is selected from the group consisting of lower alkyl, lower alkenyl, lower alkoxy, lower alkylthio, chlorine, bromine, nitro, di(lower alkyl)amino, lower alkylsulfoxide and lower alkylsulfone, and m and n are each integers from 0 to 3; Q is selected from the group consisting of lower alkyl, lower alkenyl, lower alkoxy, lower alkylthio and

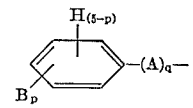

wherein B is selected from the group consisting of lower alkyl, lower alkenyl, lower alkoxy, lower alkylthio, chlorine, bromine, nitro, di(lower alkyl)amino, lower alkylsulfoxide and lower alkylsulfone, p is an integer from 0 to 3, A is selected from the group consisting of oxygen, sulfur and alkylene, and q is an integer from 0 to 1; $X^1$, $X^2$, $X^3$ and $X^4$ are selected from the group consisting of oxygen and sulfur; and $R^1$ and $R^2$ are lower alkyl. The term lower as used herein designates a branched or straight carbon chain of up to about ten carbon atoms.

The compounds of the present invention are unexpectedly useful as pesticides, particularly as insecticides and acaricides.

The compounds of this invention can be readily prepared from compounds of the formula

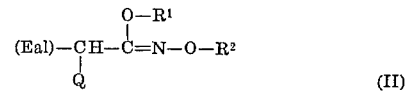

wherein Hal designates halogen, preferably chlorine or bromine, and $R^1$, and $R^2$ and Q are as hereinabove described, by reaction with about an equimolar amount of an alkali metal phosphate of the formula

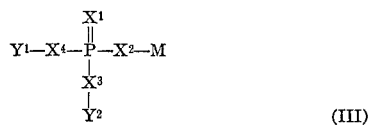

wherein M is an alkali metal and $Y^1$, $Y^2$, $X^1$, $X^2$, $X^3$ and $X^4$ are as heretofore described. This reaction can be effected by heating the reactants in an inert organic solvent such as methyl ethyl ketone at the reflux temperature of the reaction mixture for a period of from about 4 to about 24 hours. After the reaction is completed the reaction mixture can be filtered to remove the alkali metal halide which has formed. The desired product can then be conviently recovered as a residue upon evaporation of the solvent from the remaining solution. The product can then be used as such or can be further purified by washing, distillation or chromatography if the product is an oil, or by trituration, recrystallization or other common methods well known in the art if the product is a solid.

The compounds of Formula II can be prepared from an N-alkoxy amide of the formula

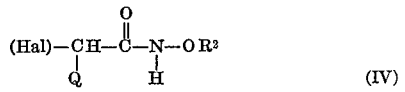

wherein Hal stands for halogen such as chlorine or bromine, and Q and $R^2$ are as hereinabove described, by reaction with a diazoalkane. This reaction can be effected by slowly adding a solution of the N-alkoxy amide of Formula IV, with stirring, to a slight molar excess of a solution of the diazoalkane at a temperature below about 15° C. and preferably at a temperature of from about −10° to about 10° C. Suitable solvents for the reactants are inert organic solvents such as ether, benzene, or ether-ethanol mixtures and the like. After the addition is completed, stirring can be continued for a short period to insure completion of the reaction. The desired product can then be recovered by evaporation of the solvents employed, and can then be used as such or can be further purified by conventional techniques well known in the art.

Exemplary diazoalkanes suitable for reaction with the alkoxyacetamides of Formula IV to form the compounds of Formula II are diazomethane, diazoethane, diazo-n-propane, diazoisobutane, diazo-n-butane, diazo-n-pentane, diazo-n-hexane, diazo-n-octane, and the like.

Exemplary N-alkoxy amides of Formula IV which can be suitably employed in preparing the compounds of Formula II are:

N-methoxy-α-chloropropionamide
N-methoxy-α-chloro-n-butyramide
N-ethoxy-α-chloroisobutyramide
N-methoxy-α-chloro-n-valeramide
N-isopropoxy-α-chlorocaproamide
N-methoxy-α-phenyl-α-chloroacetamide
N-methoxy-α-(4-chlorophenyl)-α-chloroacetamide
N-methoxy-α-(2-methylphenyl)-α-chloroacetamide
N-methoxy-α-(3-nitrophenyl)-α-chloroacetamide
N-ethoxy-α-(3-dimethylaminophenyl)-α-chloroacetamide
N-methoxy-α-(2,6-dimethoxy-4-chlorophenyl)-α-chloroacetamide
N-methoxy-α-benzyl-α-chloroacetamide
N-pentoxy-α-(3-chlrobenzyl)-α-chloroacetamide
N-pentoxy-α-(2-methoxyphenyl)-α-chloroacetamide The alkali metal phosphates of Formula III which are used in the preparation of the compounds of the present invention can be prepared from the coresponding acid by the methods described by Malatesta and Pizzotti, Chimica e Industria (Milan) 27, 6–10(1945), and Melnikov and Grapov, Zhur. Vsesoyuz Khim. Obshchestva in D.I. Mendeleeva, 6, No. 1; 119–120(1961). Exemplary of suitable salts are:

potassium O,O-dimethyl phosphate
potassium O,O-diethyl phosphate
potassium O-methyl O-ethyl phosphate
potassium O-methyl O-n-butyl phosphate
potassium O,O-di-n-propyl phosphate
potassium O-methyl O-allyl phosphate
potassium O-methyl O-phenyl phosphate
potassium O-ethyl O-(4-chlorophenyl) phosphate
potassium O-n-propyl O-(4-bromophenyl) phosphate
potassium O-methyl O-(3-methylphenyl) phosphate
potassium O-ethyl O-(2-methyl-4-chlorophenyl) phosphate
potassium O-n-pentyl O-(3-nitrophenyl) phosphate
potassium O-methyl O-(3-methylsulfonylphenyl) phosphate
potassium O-methyl O-(4-methylsulfinylphenyl) phosphate
potassium O-methyl O-(2-dimethylaminophenyl) phosphate
potassium O-methyl O-(2-chloro-6-methoxyphenyl) phosphate
potassium O-isopropyl O-(3-methylthiophenyl) phosphate
potassium O-methyl O-benzyl phosphate
potassium O-methyl O-(3,4-dichlorobenzyl) phosphate
potassium O-ethyl O-(2-chloro-4-nitrobenzyl) phosphate
potassium O-methyl O-(2,4-dibromobenzyl) phosphate
potassium O,O-diphenyl phosphate
potassium O-(4-chlorophenyl) O-phenyl phosphate
potassium O-(3-methylphenyl) O-(3,4-dichlorophenyl) phosphate
potassium O-(2-methyl-4-bromophenyl) O-(3-chlorophenyl) phosphate
potassium O-methyl O-ethyl thiolophosphate
potissium O,O-di-n-butyl thiolophosphate
potassium O-methyl O-phenyl thiolophosphate
potassium O-methyl O-(4-chlorophenyl) thionophosphate
potassium O,O-dimethyl thionothiolophosphate
potassium O,O-diphenyl thionothiolophosphate
potassium O,S-dimethyl thiolophosphate
potassium O-methyl S-ethyl thiolophosphate
potassium O-ethyl S-phenyl thiolophosphate
potassium O-methyl S-(3,4-dichlorophenyl) thiolophosphate
potassium O-phenyl S-(4-bromophenyl) thiolophosphate
potassium S,S-dimethyl dithiolophosphate
potassium O,S-dimethyl dithiolophosphate
potassium S-methyl S-phenyl dithiolophosphate
potassium S-methyl S-benzyl dithiolophosphate
potassium O-methyl S-phenyl thiolothionophosphate
potassium O-ethyl-S-(3,4-dimethylphenyl) thiolophosphate
potassium S,S-dimethyl trithiolophosphate The manner in which the compounds of the present invention can be prepared readily is further illustrated in the following examples.

EXAMPLE 1

Preparation of 1-methoxyimino-1-methoxy-2-chloropropane

Ether (275 ml.) is added to a 40% aqueous solution of potassium hydroxide (85 ml.) contained in a 500 ml. Erlenmeyer flask and the resulting mixture is cooled in an ice-salt bath to −5° C., with stirring, in the absence of light. N-nitrosomethylurea (30 grams; 0.29 mol) is added over a period of about 3 minutes with stirring and continued cooling. The ether phase is then decanted into a cooled 1 liter flask and a solution of N-methoxy-α-chloropropionamide (21 grams; 0.16 mol) in ether and ethyl alcohol is slowly added, with stirring and cooling, over a period of about 2 hours. Stirring and cooling is continued for about 4 hours after the addition is completed. The reaction mixture is then allowed to warm up to room temperature, and is dried over magnesium sulfate and filtered. The filtrate is stripped of solvents to yield 1-methoxyimino-1-methoxy-2-chloropropane.

EXAMPLE 2

Preparation of S-(1-methyl-2-methoxyimino-2-methoxyethyl) O,O-dimethyl thiolophosphate

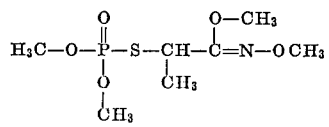

A solution of 1-methoxyimino-1-methoxy-2-chloropropane (7.6 grams; 0.05 mol) in methyl ethyl ketone is charged into a glass reaction flask equipped with a mechanical stirrer and reflux condenser. Potassium O,O-dimethyl thiolophosphate (8 grams; 0.05 mol) is added thereto and the reaction mixture is heated at reflux for a period of about 20 hours with continuous stirring. After this time the reaction mixture is cooled and filtered to remove the potassium chloride that is formed. The filtered solution is then stripped of solvent and the residue is dissolved in ether. The ether solution is washed with water and dried over anhydrous magnesium sulfate. The dried solution is evaporated under reduced pressure to yield S - (1 - methyl - 2 - methoxyimino-2-methoxyethyl) O,O-dimethyl thiolophosphate.

EXAMPLE 3

Preparation of 1-methoxyimino-1-methoxy-2-phenyl-2-chloroethane

A newly prepared solution of diazomethane (8.4 grams; 0.2 mol) in ether (100 ml.) is placed in a 1 liter glass reaction flask equipped with a magnetic stirrer and is cooled to a temperature of about 5° C. A solution of N-methoxy-α-phenyl-α-chloroacetamide (11 grams; 0.1 mol) in ether (150 ml.) is then added to the reaction flask, with continuous stirring and cooling, over a period of about 1 hour. After the addition is completed, stirring is continued for a period of about 2 hours to ensure the completion of the reaction. After this time the reaction mixture is stripped of solvent under reduced pressure to yield 1-methoxyimino-1-methoxy-2-phenyl-2-chloroethane.

EXAMPLE 4

Preparation of O-(1-phenyl-2-methoxyimino-2-methoxyethyl) O-methyl O-(4-chlorophenyl) phosphate

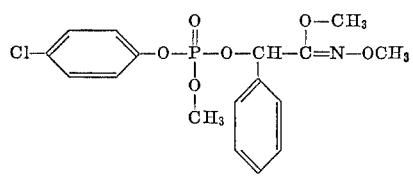

A solution of 1-methoxyimino-1-methoxy-2-phenyl-2-chloroethane (8.3 grams; 0.05 mol) in methyl ethyl ketone (100 ml.) is charged into a glass reaction vessel equipped with a mechanical stirrer and reflux condenser. Potassium O-methyl O-(4-chlorophenyl) phosphate (12.5 grams; 0.05 mol) is added to the reaction vessel and the reaction mixture is heated at reflux, with continuous stirring, for a period of about 18 hours. After this time the reaction mixture is cooled and filtered to remove the potassium chloride that is formed. The filtered solution is stripped of solvent and the residue is dissolved in ether. The ether solution is washed with water and is dried over anhydrous magnesium sulfate. The dried solution is then evaporated under reduced pressure to yield O-(1-phenyl-2-methoxyimino-2-methoxyethyl) O-methyl O-(4-chlorophenyl) phosphate.

EXAMPLE 5

Preparation of 1-methoxyimino-1-methoxy-2-(2'-methylphenyl)-2-chloroethane

A newly prepared solution of diazomethane (8.4 grams; 0.2 mol) in ether (100 ml.) is placed in a 1 liter glass reaction flask equipped with a magnetic stirrer and is cooled to a temperature of about 5° C. A solution of N-methoxy-α-(2'-methylphenyl) - α - chloroacetamide (12 grams; 0.1 mol) in ether (150 ml.) is then added to the reaction flask, with continuous stirring and cooling, over a period of about 1 hour. After the addition is completed, stirring is continued for a period of about 1 hour to ensure the completion of the reaction. After this time the reaction mixture is stripped of solvent under reduced pressure to yield 1-methoxyimino-1-methoxy-2-(2'-methylphenyl)-2-chloroethane.

EXAMPLE 6

Preparation of S-[1-(2-methylphenyl)-2-methoxyimino-2-methoxyethyl] O-methyl O-(3,4-dichlorophenyl) thiolophosphate

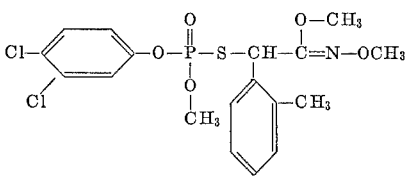

A solution of 1-methoxyimino-1-methoxy-2-(2-methylphenyl)-2-chloroethane (9 grams; 0.05 mol) in methyl ethyl ketone (100 ml.) is charged into a glass reaction vessel equipped with a mechanical stirrer and reflux condenser. Potassium O-methyl O-(3,4-dichlorophenyl) thiolophosphate (15 grams; 0.05 mol) is added to the reaction vessel and the reaction mixture is heated at reflux, with stirring, for a period of about 18 hours. After this time the reaction mixture is cooled and filtered to remove the potassium chloride that is formed. The filtered solution is stripped of solvent and the resulting residue is redissolved in ether. The ether solution is washed with water, dried over magnesium sulfate, and is evaporated under reduced pressure to yield S-[1-(2-methylphenyl)-2-methoxyimino - 2 - methoxyethyl] O-methyl O-(3,4-dichlorophenyl) thiolophosphate.

Other compounds within the scope of this invention can be prepared by the procedures described in the foregoing examples. Presented in the following examples are the essential ingredients required to prepare the indicated named compounds according to the procedures heretofore described.

EXAMPLE 7

N-methoxy-α-chloro-n-butyramide+diazomethane+potassium O,O-diethyl phosphate=O-(1-ethyl-2-methoxyimino-2-methoxyethyl) O,O-diethyl phosphate.

EXAMPLE 8

N-ethoxy-α-(3-dimethylaminophenyl) - α - chloroacetamide+diazomethane+potassium O-methyl O-(3-methylsulfonylphenyl) phosphate=O-[1-(3-dimethylaminophenyl)-2-ethoxyimino-2-methoxyethyl] O-methyl O-(3-methylsulfonylphenyl) phosphate.

EXAMPLE 9

N-n-pentyloxy-α-(4-iodophenyl)- α - chloroacetamide+diazoethane+potassium S-n-decyl O-(4-methylsulfinylphenyl) thiolophosphate=O-[1-(4-iodophenyl) - 2 - n-pentyloxyimino-2-ethoxyethyl] S-n-decyl O-(4-methylsulfinylphenyl)thiolophosphate.

EXAMPLE 10

N-methoxy - α - (3-chlorobenzyl)-α-chloroacetamide+diazo-n-octane+potassium O,O - diphenylphosphate=O-[1-(3-chlorobenzyl) - 2 - methoxyimino-2-octyloxyethyl] O,O-diphenyl phosphate.

EXAMPLE 11

N-n-propoxy-α-(4 - fluorophenyl)-α-chloroacetamide+diazo-n-hexane+potassium O,O-di-n-pentyl thiolophosphate=S-[1-(4-fluorophenyl) - 2 - n-propoxyimino-2-n-hexyloxyethyl] O,O-di-n-pentyl thiolophosphate.

EXAMPLE 12

N-methoxy-α-(4-chlorophenethyl)-α-chloroacetamide+diazomethane+potassium S-(4-isopropylthiophenyl) O-octyl thiolophosphate=O - [1 - (4-chlorophenethyl)-2-methoxyimino-2-methoxyethyl] S-(4-isopropylthiophenyl) O-octyl thiolophosphate.

EXAMPLE 13

N-methoxy-α-(2,4,6-trichlorophenyl) - α - chloroacetamide+diazomethane+potassium S-(3-phenyl-n-propyl) O-methyl dithiolophosphate=S-[1-(2,4,6 - trichlorophenyl)-2-methoxyimino - 2 - methoxyethyl] S-(3-phenyl-n-propyl) O-methyl dithiolophosphate.

EXAMPLE 14

N-n-butoxy-α-(4-pentenylphenyl) - α - chloroacetamide +diazo-n-propane+potassium S-(4-allylphenyl) S-(3-bromophenyl) dithiolophosphate=O-[1-(4-pentenylphenyl)-2-n-butoxyimino-2-n-propoxyethyl] S-(4-allylphenyl) S-(3-bromophenyl) dithiolophosphate.

EXAMPLE 15

N-methoxy - α - chlorocaproamide+diazomethane+ potassium O,O-didecyl thionophosphate=O-(1-n-butyl-2-methoxyimino-2-methoxyethyl) O,O-didecyl thionophosphate.

EXAMPLE 16

N-methoxy - α - chlorolauramide+diazomethane+potassium S,S-dimethyl dithiolophosphate=O-(1-decyl-2-methoxyimino-2-methoxyethyl) S,S-dimethyl dithiolophosphate.

EXAMPLE 17

N - methoxy - α - (2,4-dimethoxyphenyl)-α-chloroacetamide+diazomethane+potassium S - (4 - pentylsulfonylphenyl) S-methyl trithiolophosphate=S-[1-(2,4-dimethoxphenyl)-2-methoxyimino - 2 - methoxyethyl] S-(4-pentylsulfonylphenyl) S-methyl trithiolophosphate.

EXAMPLE 18

N - ethoxy-α-benzyl-α-chloroacetamide+diazomethane +potassium O-isopropyl O-methyl phosphate=O-(1-benzyl-2-ethoxyimino - 2 - methoxyethyl) O-isopropyl O-methyl phosphate.

Additional compounds within the scope of this invention can be prepared by the procedures of the foregoing examples. Exemplary of such compounds are O-(1-methyl-2-methoxyimino-2-methoxyethyl) O,O - dimethyl phosphate,
O-(1-allyl-2-methoxyimino - 2 - methoxyethyl) O-isopropyl O-phenyl phosphate,
O-(1-allyloxy-2-methoxyimino - 2 - methoxyethyl) O-methyl O-(3-methylphenyl) phosphate,
O-(1-pentenyloxy-2-ethoxyimino - 2 - methoxyethyl) O-benzyl O-phenyl phosphate,
O-(1-pentenylthio-2-t-butylimino - 2 - methoxyethyl) O-(3-bromophenyl) O-benzyl phosphate,
O-(1-decylthio-2-methoxyimino-2-ethoxyethyl) O - (4-t-butylphenyl) O-(4-chlorophenyl) phopshate,
O-[1-(3-chloro - 4 - nitrophenyl) - 2 - methoxyimino-2-methoxyethyl] O - (4 - pentylsulfinylphenyl) S-(2-methoxybenzyl) thiolophosphate,
O-[1-(4-butylthiophenyl)-2-methoxyimino - 2 - methoxyethyl) O - (2-pentyloxyphenyl) O-(3,4-diiodobenzyl) phosphate,
O-[1 - (2,6-dimethoxyphenyl)-2-methoxyimino - 2 - methoxyethyl] O-[3 - (3,4 - dichlorophenyl)-propyl]S-(3-nitrobenzyl) thiolothionophosphate,
O-(1-phenyl-2-methoxyimino - 2 - n - butoxyethyl) S-(4-dihexylaminophenyl) S-(3,4-dichlorophenyl) dithiolophosphate,
O-(1-octyl-2-ethoxyimino - 2 - methoxyethyl) S-(3-decyloxyphenyl) S-(4-n-butylsulfinylphenyl) dithiolophosphate,
S-(1-hexyloxy-2-methoxyimino-2-methoxyethyl) O - [3-(4-methylphenyl)-propyl] O-(4-bromobenzyl) thiolothionophosphate,
S-[1-(3-phenylpropyl)-2-methoxyimino - 2 - methoxyethyl] S,S-dimethyl tetrathiophosphate,
S-[1-(3-hexenylphenyl)-2-methoxyimino - 2 - methoxyethyl] S-(4-isopropylsulfonylphenyl) S-(3-methylthiophenyl) trithiolophosphate, and the like.

For practical use as insecticides or acaricides, the compounds of this invention are generally incorporated into insecticidal or acaricidal compositions which comprise an inert carrier and an insecticidally or acaricidally toxic amount of such a compound. Such insecticidal or acaricidal compositions, which can also be called formulations, enable the active compound to be applied conveniently to the site of the insect or acarid infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides or acaricides can be dispersed under superatmospheric pressure as aerosols. However, preferred liquid insecticidal or acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect or acarid infestation. The emulsifiers most commonly used in these concentrates are nonionic or mixtures of nonionic with anionic surface-active agents.

A typical insecticidal or acaricidal composition according to this invention is illustrated by the following example, in which the quantities are in parts by weight.

EXAMPLE 19

Preparation of a dust

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the insect or acarid infestation.

The compounds of this invention can be applied as insecticides or acaricides in any manner recognized by the art. One method for destroying insects or acarids comprises applying to the locus of the insect or acarid infestation, an insecticidal or acaricidal composition comprising an inert carrier, and as an essential active ingredient, in a quantity which is toxic to said insects or acarids, a compound of the present invention. The concentration of the new compounds of this invention in the insecticidal or acaricidal compositions will vary greatly with the type of formulation and the purpose for which it is designed, but generally the insecticidal or acaricidal compositions will comprise from about 0.05 to about 95 percent by weight of the active compounds of this invention. In a preferred embodiment of this invention, the insecticidal or acaricidal compositions will comprise from about 5 to 75 percent by weight of the active compound. The compositions can also comprise such additional substances as other pesticides, stabilizers, spreader, deactivators, adhesives, stickers, fertilizers, activators, synergists, and the like.

The compounds of the present invention are also useful when combined with other insecticides or acaricides in the compositions heretofore described. These other insecticides or acaricides can comprise from about 5% to about 95% of the active ingredients in the compositions. Use of the combinations of these other insecticides or acaricides with the compounds of the present invention provide insecticidal and/or acaricidal compositions which are more effective in controlling insects or acarids and often provide results unattainable with separate compositions of the individual compounds. The other insecticides or acaricides with which the compounds of this invention can be used in the insecticidal or acaricidal compositions to control insects or acarids include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled, fenthion, trichlorofon DDVP, and the like; organic nitrogen compounds such as dinitro-o-cresol, dinitrocyclohexylphenyl, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2-thiocyanoethyl)-ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal and nematocidal chemical compounds to form pesticidal compositions useful for the control of fungi and in some cases soil nematodes as well as insects or acarids. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate, and the like; while examples of nematocidal compounds are chloropicrin, O,O-diethyl O-(2,4-dichlorophenyl) phosphorothioate, tetrachlorothiophene, dazomet, dibromochloropropane, and the like.

The new compounds of this invention can be used in many ways for the control of insects or acarids. Insecticides or acaricides which are to be used as stomach poisons or protective materials can be applied to the surface on which the insects or acarids feed or travel. Insecticides or acaricides which are to be used as contact poisons or eradicants can be applied directly to the body of the insect or acarid, as a residual treatment to the surface on which the insect or acarid may walk or crawl, or as a fumigant treatment of the air which the insect or acarid breathes. In some cases, the compounds applied to the soil or plant surfaces are taken up by the plant, and the insects or acarids are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects, such as the Mexican bean beetle and the southern armyworm; the piercing-suching insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earwarm, worms or weevils, such as the codling moth, the alfalfa weevil, the cotton boll weevil, the pink boll worm, the plum curculio, the red banded leaf roller, the melonworm, the cabbage looper and the apple maggot, leaf miners, such as the apple leaf miner, the birch leaf miner and the beet leaf miner, and gall insects, such as the wheat joint worm and the grape phylloxera. Insects which attack below the surface of the ground are classified as subterranean insects and include such destrictive pests as the wooly apple aphid, the Japanese beetle, the onion maggot and the corn rootworm.

Mites and ticks are not true insects. Many economically important species of mites and ticks can be controlled by the compounds of this present invention, such as the red spider mite, the two-spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect or acarid control will depend on a variety of factors, such as the specific insect involved, intensity of the infestation, weather, type of environment, type of formulation, and the like. For example, the application of only one or two ounces of active chemical per acre may be adequate for control of a light infestation of an insect or acarid under conditions unfavorable for its feeding, while a pound or more of active compound per acre may be required for the control of a heavy infestation of insects or acarids under conditions favorable to their development.

The insecticidal utility of the compounds of the present invention can be demonstrated, for example, by experiments carried out for the control of insects by feeding. In one experiment, for the systemic control of the pea aphid (*Acyrthosiphon pisum*), 5 day old Laxton pea plants are watered with 30 ml. of an aqueous emulsion of an acetone solution of the test compound and are thereafter infested with ten, newly molted adult pea aphids. The infested plants are then placed in a holding chamber at 65° F. for a period of 48 hours and are supplied with water and light as required. After the 48 hours the mortality of the pea aphids is determined and rated on a percent basis in comparison to an untreated control. The results of this experiment indicate the high degree of activity possessed by the compounds of this invention.

The insecticidal utility of the compounds of this invention as contact poisons can be demonstrated, for example, in an experiment carried out for the control of the housefly (*Musca domestica*). In this experiment each of fifty flies is contaced with the test compounds, formulated as an aqueous emulsion of an acetone solution, by applying the formulation to the dorsum of its thorax. The flies are then placed in a wire mesh cage where they are supplied with sugar syrup. After the end of a 24 hour period the mortality of the flies is observed and is rated in comparison to untreated controls. The results of this experiment indicate the high degree of activity possessed by the compound of this invention.

The acaricidal utility of the compounds of the present invention can be demonstrated, for example, by experiments carried out for the control of the two-spotted spider mite (*Tetranychus urticae*). In one such experiment, whrein the systemic activity is demonstrated, 5 day old Henderson bush lima bean plants are each watered with 30 ml. of a formulation containing the test compounds at a concentration of 3500 parts per million. After a period of 48 hours the plants are infested with two-spotted spider mites and are placed in a holding room and supplied with water and light as required. After a period of 5 days the mortality of the mites is determined and rated on a percent basis in comparison to untreated controls.

The results of this experiment indicate the high degree of acaricidal activity possessed by the compounds of this invention.

We claim:

1. A compound of the formula

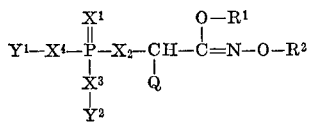

wherein $Y^1$ and $Y^2$ are independently selected from the group consisting of alkyl, alkenyl and

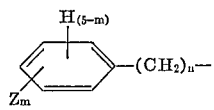

wherein Z is selected from the group consisting of lower alkyl, lower alkenyl, lower alkoxy, lower alkylthio, halogen, nitro, diloweralkylamino, lower alkylsulfoxide and lower alkylsulfone, $m$ is an integer from 0 to 5, and $n$ is an integer from 0 to 3; Q is selected from the group consisting of lower alkyl, lower alkenyl, lower alkoxy, lower alkylthio and

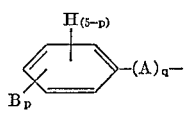

wherein B is selected from the group consisting of lower alkyl, lower alkenyl, lower alkoxy, lower alkylthio, halogen, nitro, diloweralkylamino, lower alkylsulfoxide and lower alkylsulfone, $p$ is an integer from 0 to 5, A is selected from the group consisting of oxygen, sulfur, lower alkylene and lower alkyleneoxy, and $q$ is an integer from 0 to 1; $X^1$, $X^2$, $X^3$ and $X^4$ are independently selected from the group consisting of oxygen and sulfur; and $R^1$ and $R^2$ are lower alkyl.

2. The compound of claim 1, S-(1-methyl-2-methoxyimino-2-methoxyethyl) O,O-dimethylthiolophosphate.

3. The compound of claim 1, O-(1-phenyl-2-methoxyimino-2-methoxyethyl) O-methyl O - (4 - chlorophenyl) phosphate.

4. The compound of claim 1, S-[1-(2-methylphenyl)-2-methoxyimino-2-methoxyethyl] O-methyl O-(3,4-dichlorophenyl) thiolophosphate.

5. The compound of claim 1, O-[1-(3,4-dichlorophenyl)-2-methoxyimino - 2 - methoxyethyl] O - methyl O-(2-methyl-4-bromophenyl) phosphate.

6. The compound of claim 1, S-(1-isopropyl-2-ethoxyimino-2-methoxyethyl) O-(3,4-dichlorophenyl) O-(3,4,5-trichlorophenyl) phosphate.

References Cited

UNITED STATES PATENTS 3,053,876  9/1962  Malz et al. _____ 260—944X

CHARLES B. PARKER, Primary Examiner

A. H. SUTTO, Assistant Examiner

U.S. Cl. X.R.

260—453R; 424—215